US008259430B2

(12) United States Patent
Alkan

(10) Patent No.: US 8,259,430 B2
(45) Date of Patent: Sep. 4, 2012

(54) SURGE PROTECTION DEVICE FOR ISOLATING PREMISE DEVICES

(75) Inventor: Erdogan Alkan, Fayetteville, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 0 days.

(21) Appl. No.: 12/567,086

(22) Filed: Sep. 25, 2009

(65) Prior Publication Data

US 2011/0075311 A1 Mar. 31, 2011

(51) Int. Cl.

| | |
|---|---|
| ***H01C 7/12*** | (2006.01) |
| ***H02H 1/00*** | (2006.01) |
| ***H02H 1/04*** | (2006.01) |
| ***H02H 3/22*** | (2006.01) |
| ***H02H 9/06*** | (2006.01) |

(52) U.S. Cl. .......................................... 361/119; 361/56

(58) Field of Classification Search .................. 361/119, 361/91.1

See application file for complete search history.

(56) References Cited

U.S. PATENT DOCUMENTS 4,158,185 A 6/1979 Dageforde et al.
4,481,641 A 11/1984 Gable et al.
4,554,608 A 11/1985 Block
4,963,966 A 10/1990 Harney et al.
5,122,921 A * 6/1992 Koss ............................ 361/111
5,352,984 A 10/1994 Piesinger
5,384,603 A 1/1995 Strauss et al.
5,546,005 A * 8/1996 Rauchwerger ................ 324/688
5,712,755 A 1/1998 Glaser et al.
5,793,590 A 8/1998 Vokey et al.
5,896,265 A 4/1999 Glaser et al.
6,057,873 A 5/2000 Adams, III
6,061,223 A 5/2000 Jones et al.
6,141,194 A 10/2000 Maier
6,144,737 A * 11/2000 Maruyama et al. ........... 379/413
6,195,245 B1 2/2001 Kobsa
6,236,551 B1 5/2001 Jones et al.
6,507,873 B1 * 1/2003 Suzuki et al. ................. 709/245
6,697,239 B2 2/2004 Pixley et al.
6,853,526 B1 2/2005 van Saders et al.
6,975,496 B2 12/2005 Jones et al.
7,054,127 B1 5/2006 Scearce et al.
7,061,355 B2 6/2006 Tanaka et al.
7,082,022 B2 * 7/2006 Bishop .......................... 361/119
7,154,727 B2 * 12/2006 Ghahary ........................ 361/119
7,170,728 B2 * 1/2007 Mueller .......................... 361/56

(Continued)

OTHER PUBLICATIONS

PCT/US2010/050245, International Search Report and the Written Opinion. Date of Mailing: May 20, 2011. 10 pages.

*Primary Examiner* — Dharti Patel

(74) *Attorney, Agent, or Firm* — Schmeiser, Olsen & Watts LLP

(57) ABSTRACT

A surge protector comprises an internal circuitry configured to isolate a premise device from a surge input. In one embodiment, the internal circuitry can comprise a first signal path and a second signal path that is inductively coupled to the first signal path. Each of the first signal path and the second signal path can comprise windings, such as the windings that are found in an RF transformer. The internal circuitry can also comprise a blocking element, which is coupled to the second signal path so that the blocking element receives the surge input before the premise device.

20 Claims, 3 Drawing Sheets

U.S. PATENT DOCUMENTS

| | | | | |
|---|---|---|---|---|
| 7,345,864 | B2 | 3/2008 | Marland | |
| 7,602,596 | B1 | 10/2009 | Schley-May et al. | |
| 2001/0000985 | A1 | 5/2001 | Kobsa | |
| 2004/0264087 | A1 | 12/2004 | Bishop | |
| 2005/0207079 | A1 | 9/2005 | Tiller et al. | |
| 2008/0080116 | A1 | 4/2008 | Qin et al. | |
| 2009/0028320 | A1* | 1/2009 | Fuehrer et al. | 379/392.01 |
| 2010/0061034 | A1* | 3/2010 | Kaplan et al. | 361/256 |
| 2010/0095344 | A1 | 4/2010 | Newby et al. | |
| 2011/0010749 | A1 | 1/2011 | Alkan | |
| 2011/0075312 | A1 | 3/2011 | Alkan | |
| 2011/0138440 | A1 | 6/2011 | Shafer et al. | |

* cited by examiner

SURGE PROTECTION DEVICE FOR ISOLATING PREMISE DEVICES

FIELD OF THE INVENTION

The present invention is directed to surge protection, and more particularly, to embodiments of a surge protection device that isolate devices from surge inputs by preventing the surge input from reaching the device.

BACKGROUND OF THE INVENTION

Community antenna television ("CATV") systems provide a premise with many services including, but not limited to, Internet service, telephone service (e.g., voice-over-Internet protocol ("VOIP") telephone), television service, and music service. Each of these services requires the CATV system and the premise to exchange bandwidth, such as, for example, radio frequency ("RF") signals, and digital signals, among many others. Typically the CATV system is configured to use bandwidths that are separated from one another for the purpose of grouping transmissions, and more often the grouping is by the direction that the transmission are transmitted or received in the CATV system. That is, transmissions that have one frequency may be transmitted or received relative to the premise and/or the head-end of the CATV system in a direction that is different from transmissions that have a second frequency. As one example, transmissions that originate from the head-end facility and are transmitted to the premise are referred to herein as a downstream bandwidth, while transmissions that originate from the premise and are transmitted to the head-end facility are referred to herein as an upstream bandwidth.

FIG. 1 illustrates one example of a CATV system 100 that includes a head-end facility 102 and a local network 104, which are connected to the head-end facility 102 by distribution lines 106. The local network 104 includes a feed tap 108, a drop-line 110, and a portion 112 with a premise 114. The premise 114 is connected to the head-end facility 102 via the combination of the distribution line 106, the feed tap 108, and the drop-line 110. The system 100 further includes a downstream bandwidth 116 and an upstream bandwidth 118, both of which are discussed in more detail below.

Typically the downstream bandwidth 116 and the upstream bandwidth 118 are defined by upper and lower cutoff frequencies. Exemplary frequencies for the downstream bandwidth 116 are more than about 54 Mhz, and in one application can be from about 54 Mhz to about 1002 Mhz. Frequencies for use as the upstream bandwidth 118 are less than about 40 Mhz, and in one application can be from about 5 Mhz to about 40 Mhz.

The terms "downstream bandwidth," and "upstream bandwidth" are used herein to generally describe some of the transmissions that are transmitted, exchanged, and manipulated within systems such as the CATV system 100. As is inherent in systems such as system 100, these terms are used in a manner that describes any number of transmissions. Moreover, each of the transmissions that are described by these terms may exhibit properties that are similar to, or different from, other the properties of other transmissions. These other transmissions can also be classified by the terms "downstream bandwidth," and/or "upstream bandwidth" as used in connection with the various embodiments of the present invention that are disclosed, described, and contemplated herein.

In addition to CATV systems, systems that are configured similar to the system 100 of FIG. 1 include, but are not limited to, other uni-directional, and bi-directional communication systems that communicate with remote premises, e.g., premise 114. Similar systems may conduct the transmissions via transmission lines, e.g., distribution lines 106, and drop lines 110. Transmission lines of the type used as the transmission lines are typically transmission-carrying conductors such as, for example, coaxial cable, shielded cable, multi-core cable, ribbon cable, and twisted-pair cable, among others.

Premises that are connected to the system 100 such as the premise 114 include, for example, homes, apartments (e.g., individual apartments, and/or townhomes), and businesses. These premises can have any number of devices and or appliances (collectively, "premise devices") that are coupled either directly or indirectly to the drop-line 110. Techniques and equipment that are used to connect each of the individual premise devices to the head-end facility 102 are generally well-known to those familiar with CATV systems, and therefore a detailed discussion is not provided for purposes of the present discussion.

The premise devices can include, but are not limited to, modems, desktop computers, notebook computers, televisions, gaming consoles, set-top-boxes (STB), and set-top-units (STU), among many others. These are generally configured to communicate with the head-end facility 102, via the downstream bandwidth 116 and the upstream bandwidth 118. For example, the premise devices typically receive the downstream bandwidth 116 from the head-end facility 102, and can transmit the upstream bandwidth 118 to the head-end facility 102.

During periods of normal operation, systems such as the CATV system 100 conduct transmissions that are found within the frequency bands discussed above. It is recognized, however, that the scope, construction, and general breadth of the CATV system 100 makes these systems susceptible to transient events such as, for example, lightning strikes, power outages, and switching events. These transient events can generate inputs (hereinafter, "surge inputs") that fall outside of the frequency bands for the upstream bandwidth and the downstream bandwidth. Moreover, it is common that the transient events can generate surge inputs that fall into frequency bands that are below 1 Mhz. For example, if a component of the CATV system is struck by lightning, the surge inputs typically have a frequency that is less than about 1 Mhz, and energy levels that are sufficient to damage the premise devices.

Surge inputs like the ones discussed above are harmful to many electrical components, and particularly harmful to premise devices that are connected to the CATV system. It is therefore preferable to provide some type of surge protection device, which is designed to prevent damage to the premise device. However, a prerequisite for any such surge protection device is that it should also pass transmissions that are found in the desired frequency bands, such as, for example, the frequency bands of the downstream bandwidth and the upstream bandwidth.

Many surge protection devices are implemented in series between the part of CATV system where the surge input originates and the premise devices. Unfortunately, these devices typically do not prevent the surge input from reaching the premise device. Rather the devices (e.g., gas discharge tubes ("GDTs") and/or metal oxide varisters ("MOVs")) are invariably constructed with a built-in delay, or response time. This delay allows the surge input to momentarily reach the premise device before the device is fully activated to completely protect the premise device from the surge input. Such delay is inherently detrimental because the slower the response time, the more likely it is that damage will occur to the premise device.

Therefore, a surge protection device is needed that can prevent the surge input from reaching the premise device, and more particularly, a surge protection device is needed that it is fully activated so as to provide complete protection from the surge input. It is also desirable that the surge protection device is constructed in a manner so as to increase its life expectancy, and to reduce the need for maintenance and/or replacement after the transient event occurs in the CATV system.

SUMMARY OF THE INVENTION

Addressing in one aspect the issues with the MOVs and the GDTs, embodiments of the present invention are configured to isolate the premise devices from the surge inputs. For example, the surge protection devices that incorporate the concepts of the present invention can respond to surge inputs significantly faster than MOVs and GDTs, e.g., by isolating the premise devices from the surge inputs in a manner that prevents damage to the premise device. As discussed in more detail below, these embodiments also permit the transmissions that are in the favorable bandwidths to reach the premise device.

It is described below that in one embodiment, the present invention embodies a surge protection device for isolating a premise device from a surge input, in which the device can comprise a first surge path receiving a downstream bandwidth, and a second surge path inductively coupled to the first surge path, the second surge path receiving the downstream bandwidth after the first surge path. The surge protection device can further comprise a blocking element coupled to the second surge path in a position receiving the surge input before the premise device.

In another embodiment, the present invention embodies a signal conditioning device configured to isolate a premise device from a surge input in a CATV system, in which the signal conditioning device can comprise a first signal path for receiving a downstream bandwidth from the CATV system. The device can also comprise an RF transformer that is coupled to the first signal path, the RF transformer can comprise a first winding and a second winding inductively coupled to the first winding. The device can comprise a second signal path that is coupled to the second winding, the second signal path for transmitting the downstream bandwidth to the premise device. The device can further comprise a blocking element coupled to the second signal path in a position receiving the surge input before the premise device.

In yet another embodiment, the present invention embodies a system for blocking a surge input from a premise device in a premise. The system can comprise a surge protection device secured to the premise, the surge protection device can comprise an internal circuitry having a head-end side and a premise side. The internal circuitry can comprise a first surge path coupled to the head-end side, the first surge path receiving a downstream bandwidth, a second surge path inductively coupled to the first surge path, the second surge path for transmitting the downstream bandwidth to the premise side, and a blocking element coupled to the internal circuitry, the blocking element receiving the surge input before the premise device. The system is further configured wherein the surge input passes through one or both of the first winding and the second winding to a ground.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments.

Thus, for further understanding of the nature and objects of the invention, references can be made to the following detailed description, read in connection with the drawings in which.

DETAILED DESCRIPTION OF THE INVENTION

There is provided a surge protection device, and implementation thereof, embodiments of which are useful to isolate sensitive equipment such as televisions, set-top-boxes, and modems. These embodiments can be particularly configured to prevent surge inputs, such as those surge inputs that result from lightning strikes within the CATV system, from reaching these devices. For example, it is discussed in more detail below that certain embodiments of the surge protection devices can comprise a single pathway that is configured not only to pass transmissions between the premise devices and the head-end facility, but also to block the surge inputs and prevent them from generating voltage at the premise device. These embodiments typically include one or more groups of electrical circuits that are each configured to operate, separately or in conjunction with other electrical circuits, to pass the downstream bandwidth, while also being configured to block the surge input so as to prevent the surge input from damaging the premise devices.

The electrical circuits that are used to implement one or more of the concepts of the present invention are constructed in a manner that interconnect a variety of electrical elements such as, but not limited to, resistors, capacitors, transistors, inductors, transmission lines, and switches. These circuits may further communicate with other circuits (and/or devices), which execute high-level logic functions, algorithms, as well as process firmware, and software instructions. Exemplary circuits of this type include, but are not limited to, field programmable gate arrays ("FPGAs"), and application specific integrated circuits ("ASICs"). While all of these elements, circuits, and devices function individually in a manner that is generally understood by those artisans that have ordinary skill in the CATV arts, it is their combination and integration into functional electrical groups and circuits that generally provide for the concepts of the present invention that are disclosed and described herein.

Figure 1:
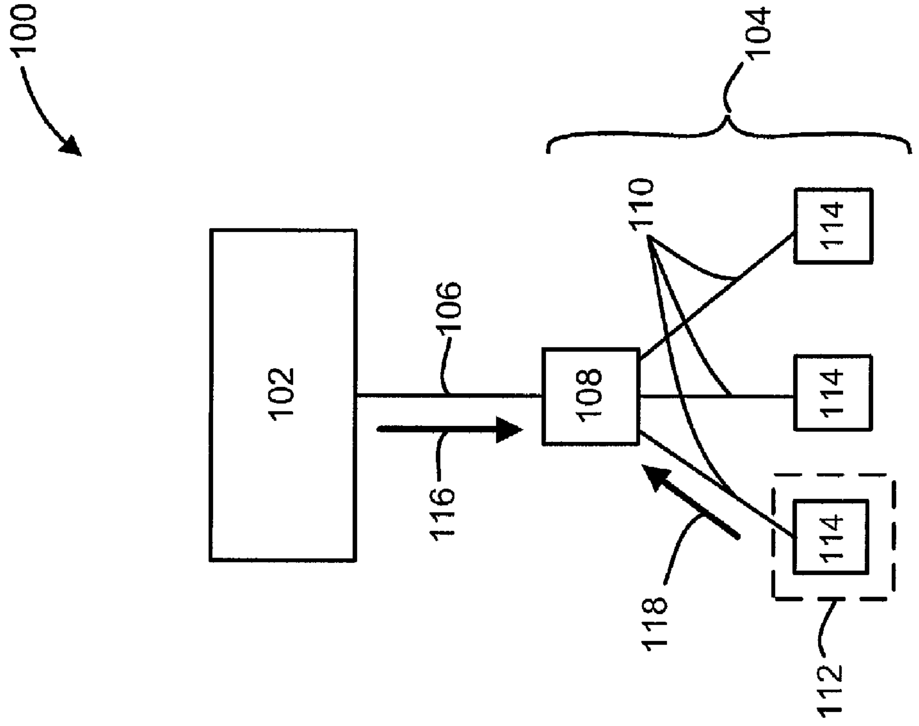
FIG. 1 is a schematic diagram of a CATV system that includes one example of a surge protector that is made in accordance with concepts of the present invention.

In addition to the electrical circuits that are described above, as well as the other embodiments of the surge protection device that are provided in FIGS. 2 and 3 and described in detail below, it is likewise practical that the concepts of the present invention are implemented as part of, or in combination with, other signal processing devices that are used to connect the premise with the head-end facility 102 (FIG. 1) of the CATV system 100 (FIG. 1). These combinations may include devices that condition the upstream bandwidth. The combinations may also include devices that provide signal attenuation, signal processing, and signal amplification of one or both of the upstream bandwidth and the downstream bandwidth. This functionality may be incorporated into the devices provided herein, and also in separate devices that are coupled to, or that otherwise interface with the devices that are made in accordance with the present invention.

Figure 2:
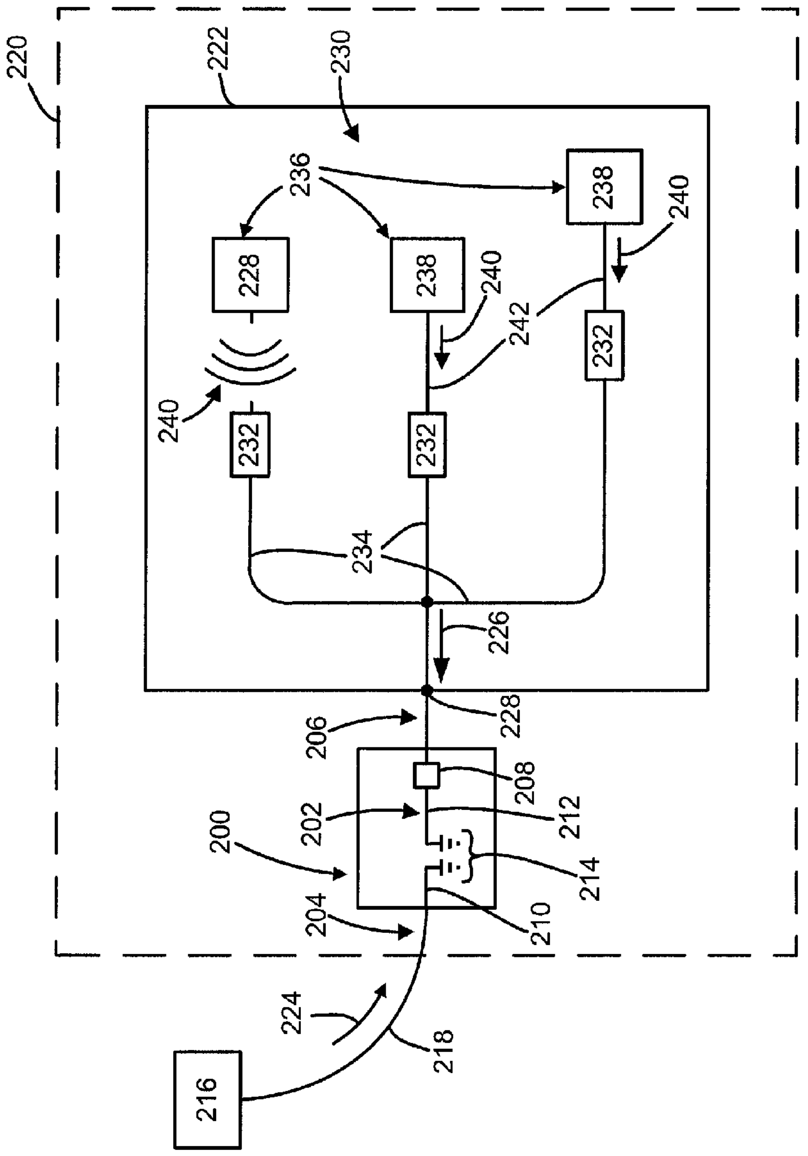
FIG. 2 is a schematic detailed diagram of a portion of a CATV system, such as the CATV system of FIG. 1, that includes an embodiment of a surge protection device that is made in accordance with concepts of the present invention.

In view of the foregoing, and as can be seen in FIG. 2, there is illustrated an example of a surge protection device 200 that is made in accordance with concepts of the present invention. Here, it is seen that the surge protection device 200 can comprise an internal circuitry 202 that has a head-end side 204 and a premise side 206. The internal circuitry 202 can also comprise a blocking element 208, a first surge path 210 coupled to the head-end side 204, and a second surge path 212, which is coupled to the premise side 206, and the blocking element 208. Each of the first surge path 210 and the second surge path 212 can comprise a ground 214.

The premise side 206 is coupled to a feed tap 216 via a drop line 218. The signal conditioning device 200 is positioned in a portion 220 of a system (not shown), and more particularly the premise side 206 is coupled to a premise 222. This configuration is similar to the portion 112 of the system 100 of FIG. 1, described in the Background section above.

The premise 222 receives a downstream bandwidth 224, and generates an upstream bandwidth 226, which is discussed in more detail below. The premise 222 includes a head-end access point 228, and an internal wiring system 230 with a plurality of input ports 232, and a plurality of lines 234, which connect the head-end access point 228 with each of the input ports 232. The premise 222 may also have a number of signal operative devices 236 that includes several premise devices 238 that generate a transmission 240.

The premise 222 further includes connective cables 242 that connect the premise devices 238 to, e.g., the input ports 232. Wireless technology is also suitable for connecting the premise devices 238 to the input ports 232. The transmissions 240 are carried by one or more of the lines 234 towards the head-end access point 228, and exit the premise 222 at the head-end access point 228. Exemplary transmissions that the transmission 238 can be include, but are not limited to, transmissions from modems, set-top-boxes, televisions, computers, and any combination thereof.

It is shown in FIG. 2 that the surge protection device 200 can be secured to the outside of the premise 222 such as, for example, to the outside of a home, apartment, office building, and the like. In other implementations, however, the surge protection device 200 is configured so that it can be positioned inside of the premise 222. This configuration includes positions inside of the premise 222 where the surge protection device 200 can receive the downstream bandwidth 224 before it is transmitted to the premise devices 236.

The terms "head-end side" and "premise side" are used to refer to opposite ends of an element or object, e.g., the surge protection device 200 and/or the internal circuitry 202, and do not limit the scope and extent of the present disclosure. Rather, and as discussed in connection with the surge protection devices that are contemplated by the present disclosure, parts of the surge protection devices are configured so that they receive the downstream bandwidth 224 before other parts of the surge protection device. While generally being defined as the relative location between these parts, it will in some embodiments include one part of the surge protection device 200, e.g., the head-end side 204, which receives the downstream bandwidth 224 (including the surge input) before another part of the surge protection device 200, e.g., the premise side 206.

As set forth in the discussion above, the CATV system can be susceptible to lightning and other transient events that can result in surge inputs, and more particularly surge inputs that are found in the downstream bandwidth 224. To address these surge inputs, the internal circuitry 202 can be constructed so that the surge protection device 200 can isolate the premise device 238 from the surge inputs, without disrupting the communication between the head-end facility (e.g., the head-end facility 102 (FIG. 1)) and the premise device 238. This communication includes transmissions that are found in the bandwidth of both the downstream bandwidth 224 and the upstream bandwidth 226. For example, surge protection devices of the type contemplated herein can be constructed to accommodate a very broad bandwidth. That is, embodiments of the surge protection device 200 can accommodate bandwidths that may be greater than 3000 Mhz, with one particular construction of the surge protection device in this range set being constructed to accommodate from about 5 Mhz to about 2000 Mhz.

Although a variety of constructions can be used to embody the concepts that are contemplated by the present disclosure, it may be desirable that the first surge path 210, and the second surge path 212 (hereinafter "the surge paths") comprise cables and conducting devices such as coaxial cable, optical cable, as well as other conducting devices consistent with the transmissions being conducted in the particular application, e.g., the CATV system 100 (FIG. 1). The surge paths can also comprise electrical elements, and/or electrical circuits that can communicate the transmissions between the head-end side 204 and the premise side 206. Exemplary elements can include, for example, inductors and similar windings that can facilitate communication between the surge paths, such as by providing for coupling (e.g., inductively coupling) of the surge input, as well as the transmissions of the downstream bandwidth 224 and upstream bandwidth 226.

When used in conjunction with the surge paths, the blocking element 208 can be configured to prevent the surge inputs from generating voltage that can damage the premise device 226. That is, the blocking element 208 can be selected so as to block the surge input from reaching a load, e.g., the premise device 226. Suitable blocking elements for use as the blocking element 208 can block surge inputs that can cause damage. These blocking elements can also permit transmissions such as radio frequency ("RF") signals to pass through to the premise device 226. This selective passage can be accomplished using a suitably designed electrical circuit, which comprises one or more electrical elements such as a capacitor, a resistor, a transistor, an inductor, and any combinations thereof. Details of one construction of internal circuitry for use as the internal circuitry 202 is provided in connection with the embodiment of the surge protection device that is illustrated in FIG. 3 and described below.

Figure 3:
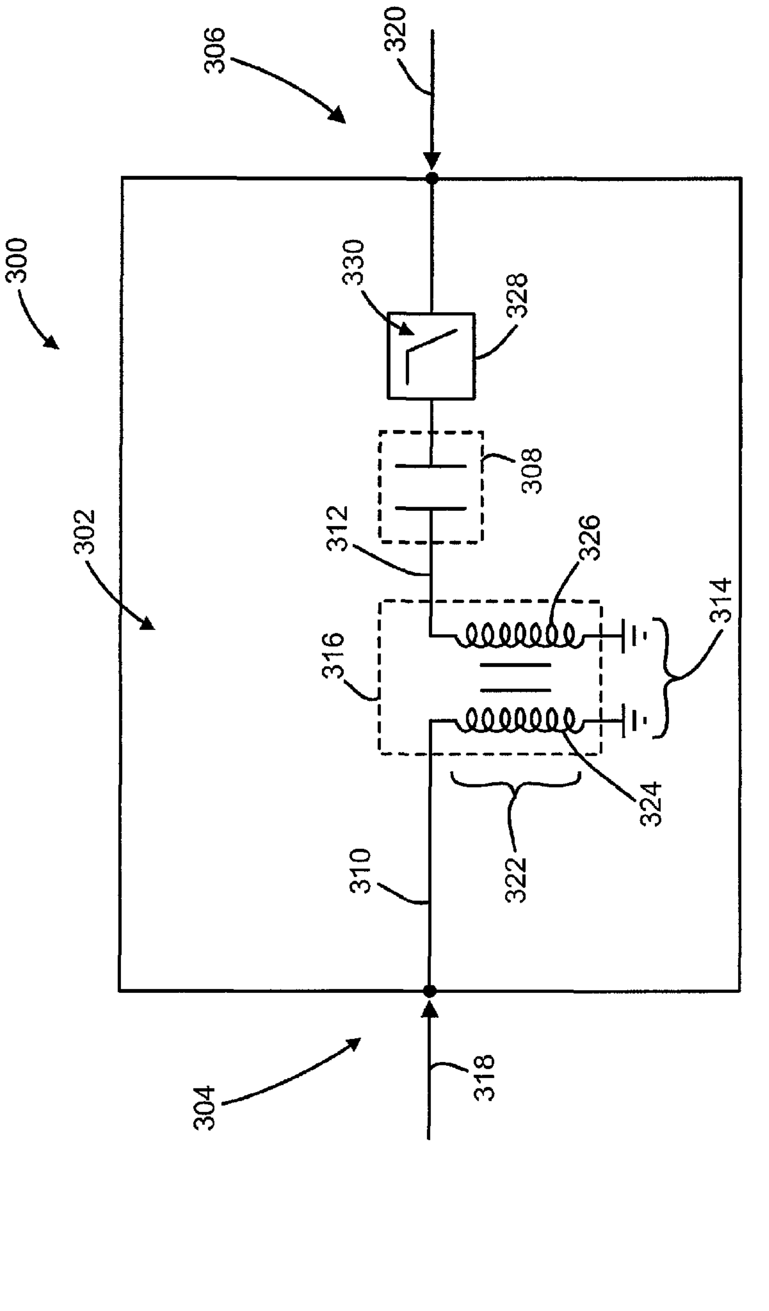
FIG. 3 is a schematic diagram of another example of a surge protection device for use in a CATV system, such as the CATV system of FIG. 1.

For example, and with reference to FIG. 3, another embodiment of a surge protection device 300 is illustrated. Here it is seen that the surge protection device 300 can comprise an internal circuitry 302, a head-end side 304, a premise side 306, a blocking element 308, a first surge path 310, a second surge path 312, and a ground 314. The surge protection device 300 can also comprise an RF transformer 316, which is coupled to the first surge path 312 and the second surge path 314. This configuration permits transmission of a downstream bandwidth 318, and an upstream bandwidth 320 between the head-end side 304 and the premise side 306. The RF transformer 316 can comprise a plurality of windings 322.

In one example, the windings 322 can comprise a first winding 324 and a second winding 326 coupled, respectively, to the first surge path 310 and the second surge path 312.

The surge protection device 300 can further comprise at least one filter device 328, which is coupled to the second surge path 312. The filter device 328 can comprise a filter circuit 330, such as, but not limited to, a low pass filter, a high pass filter, a bandpass filter, and any combinations thereof. In one example, the filter circuit 330 is positioned so that it receives the downstream signal 318 after the blocking element 308, and it receives the upstream signal 320 before the blocking element 308.

It may be desirable that the RF transformer 316 is constructed for use with a bandwidth of at least about 3000 Mhz, with one typical construction being compatible with bandwidths from about 5 Mhz to about 2000 Mhz. It is contemplated, however, that a variety of configurations and constructions are possible for the RF transformer 316 so that the surge protection device 300 is made in accordance with the concepts, scope and spirit of the present disclosure. Examples of suitable transformers for use as the RF transformers 316 can include, but are not limited to, a Ruthoff transformer, a Guanella transformer, a Marchand transformer, a Balun transformer, and any combinations thereof.

The blocking element 308 is typically positioned so that it receives the surge input after the RF transformer 316. The blocking element 308 can also be positioned so that it receives the upstream bandwidth 320 before the RF transformer 316. As discussed above, blocking elements of the type that are used as the blocking element 308 are generally selected so that, when placed in series with the RF transformer 316, the blocking element 308 isolates the premise device, e.g., the premise device 236 (FIG. 2). In addition to the examples discussed above of the suitable devices, circuits, and combinations that can be used as the blocking element 308, it is further contemplated that devices with a dielectric material can be implemented as part of the blocking element 308.

Discussing the operation of the surge protection device 300 in more detail, it is contemplated that the device 300 is configured to pass the upstream bandwidth 320 from the premise side 306 to the head-end side 304. The device 300 is likewise configured to pass the downstream bandwidth 318 from the head-end side 304 to the premise side 306. These features allow the premise devices (not shown) to communicate with the head-end facility (not shown). In one embodiment of the device 300, these features are facilitated by the use of the RF transformer 316, in which the downstream bandwidth 318, and the upstream bandwidth 320 can be conducted via the first surge path 310, and the second surge path 312, and inductively coupled across the windings 322 so as to facilitate passage between the head-end side 304 and the premise side 306. In the event that surge inputs are generated in the system (not shown), the device 300 is configured to block the surge inputs from causing damage to the premise devices. In one embodiment, this feature is facilitated by the blocking element 308, and more particularly the blocking element 308 is selected so as to block the surge input long enough for the surge input to dissipate through the windings 318 of the RF transformer 316, and to a level that it can no longer damage the premise devices.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified.

That is, numerical values can include the actual value that is expressly stated, as well as other values that are, or can be, the decimal, fractional, or other multiple of the actual value indicated, and/or described in the disclosure.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A surge protection device for isolating a premise device from a surge input, said surge protection device comprising:
- a first surge path receiving a downstream bandwidth;
- a second surge path inductively coupled to the first surge path with an inductive coupling, the second surge path receiving the downstream bandwidth after the first surge path; and
- a blocking element located in the second surge path in a position receiving the surge input before the premise device, wherein the blocking element is configured to block the surge input long enough for the surge input to dissipate through the inductive coupling to prevent the surge input from reaching the premise device, wherein the inductive coupling and the blocking element are connected in series.

2. A surge protection device according to claim 1, wherein the inductive coupling includes a first winding coupled to the first surge path, and a second winding coupled to the second surge path, wherein the downstream bandwidth passes from the first winding to the second winding.

3. A surge protection device according to claim 1, wherein the inductive coupling is an RF transformer coupling the first surge path and the second surge path.

4. A surge protection device according to claim 3, wherein the RF transformer comprises one or more of a Ruthoff transformer, a Guanella transformer, a Marchand transformer, and a Balun transformer.

5. A surge protection device according to claim 1, further comprising a filter circuit coupled to the second surge path between the blocking element and the premise device.

6. A surge protection device according to claim 5, wherein the filter circuit comprises one or more of a low pass filter, a high pass filter, and a bandpass filter.

7. A surge protection device according to claim 1, wherein the blocking element comprises a dielectric material.

8. A surge protection device according to claim 1, wherein the blocking element comprises a capacitor.

9. A signal conditioning device configured to isolate a premise device from a surge input generated in a CATV system, said signal conditioning device comprising:
- a first signal path for receiving a downstream bandwidth from the CATV system;
- an RF transformer coupled to the first signal path, the RF transformer comprising a first winding and a second winding inductively coupled to the first winding;
- a second signal path coupled to the second winding, the second signal path for transmitting the downstream bandwidth to the premise device; and
- a blocking element coupled to the second signal path in a position receiving the surge input before the premise device, wherein the blocking element is configured to block the surge input long enough for the surge input to dissipate through the first and second windings to prevent the surge input from reaching the premise device, wherein the blocking element and the RF transformer are connected in series.

10. A signal conditioning device according to claim 9, wherein the RF transformer comprises one or more of a Ruthroff transformer, a Guanella transformer, a Marchand transformer, and a Balun transformer.

11. A signal conditioning device according to claim 9, further comprising a filter circuit coupled to the second signal path between the blocking element and the premise device.

12. A surge protection device according to claim 11, wherein the filter circuit comprises one or more of a low pass filter, a high pass filter, and a bandpass filter.

13. A system for blocking a surge input from a premise device in a premise, the system comprising:

a surge protection device secured to the premise, the surge protection device comprising an internal circuitry having a head-end side and a premise side, the internal circuitry comprising, a first surge path coupled to the head-end side, the first surge path receiving a downstream bandwidth, a second surge path inductively coupled to the first surge path with an inductive coupling having a first winding and a second winding, the second surge path for transmitting the downstream bandwidth to the premise side, and a blocking element coupled to the internal circuitry, the blocking element receiving the surge input before the premise device, wherein the blocking element is configured to block the surge input long enough for the surge input to dissipate through the inductive coupling to prevent the surge input from reaching the premise device, and wherein the inductive coupling and the blocking element are connected in series, wherein the surge input passes through one or both of the first winding and the second winding to a ground.

14. A system according to claim 13, wherein the inductive coupling includes a first winding coupled to the first surge path, and a second winding coupled to the second surge path, wherein the downstream bandwidth passes from the first winding to the second winding.

15. A system according to claim 13, wherein the inductive coupling is an RF transformer coupling the first surge path and the second surge path.

16. A system according to claim 15, wherein the RF transformer comprises one or more of a Ruthroff transformer, a Guanella transformer, a Marchand transformer, and a Balun transformer.

17. A system according to claim 13, further comprising a filter circuit coupled to the second surge path between the blocking element and the premise device.

18. A system according to claim 17, wherein the filter circuit comprises one or more of a low pass filter, a high pass filter, and a bandpass filter.

19. A system according to claim 13, wherein the blocking element comprises a dielectric material.

20. A system according to claim 13, wherein the blocking element comprises a capacitor.

* * * * *